United States Patent
Lutz et al.

(10) Patent No.: US 10,331,406 B2
(45) Date of Patent: Jun. 25, 2019

(54) HANDLING FLOATING-POINT OPERATIONS

(71) Applicant: Arm Limited, Cambridge (GB)

(72) Inventors: David Raymond Lutz, Austin, TX (US); Thomas Gilles Tarridec, Austin, TX (US)

(73) Assignee: ARM Limited, Cambridge (GB)

( * ) Notice: Subject to any disclaimer, the term of this patent is extended or adjusted under 35 U.S.C. 154(b) by 18 days.

(21) Appl. No.: 15/816,076

(22) Filed: Nov. 17, 2017

(65) Prior Publication Data

US 2019/0155573 A1    May 23, 2019

(51) Int. Cl.
G06F 7/499    (2006.01)
G06F 7/483    (2006.01)

(52) U.S. Cl.
CPC ...... *G06F 7/483* (2013.01); *G06F 2207/4835* (2013.01)

(58) Field of Classification Search
None
See application file for complete search history.

(56) References Cited

U.S. PATENT DOCUMENTS

| | | | | |
|---|---|---|---|---|
| 8,996,600 | B1 * | 3/2015 | Langhammer | G06F 7/485 708/503 |
| 10,078,512 | B2 * | 9/2018 | Elmer | G06F 7/485 |
| 2008/0215659 | A1 * | 9/2008 | Cowlishaw | G06F 7/483 708/497 |
| 2018/0095749 | A1 * | 4/2018 | Elmer | G06F 7/485 |

\* cited by examiner

*Primary Examiner* — David H Malzahn
(74) *Attorney, Agent, or Firm* — Nixon & Vanderhye P.C.

(57) ABSTRACT

A data processing apparatus and method of operating a data processing apparatus are disclosed. Comparisons are made between first and second floating-point operands received. A more significant portion of the first floating-point operand and of the second floating-point operand are subject to comparison. The more significant portion of the first floating-point operand minus a least significant bit in the more significant portion is subject to comparison with the more significant portion of the second floating-point operand. A less significant portion of the first floating-point operand and of the second floating-point operand are also subject to comparison. In dependence on the outcome of these comparisons, right-shift circuitry is used selectively to perform a 1-bit right shift on a difference calculated between the first floating-point operand and the second floating-point operand.

14 Claims, 7 Drawing Sheets

HANDLING FLOATING-POINT OPERATIONS

TECHNICAL FIELD

The present disclosure relates to data processing. In particular, the present disclosure relates to the field of floating-point operations.

DESCRIPTION

Floating-point format represents a number as a significand multiplied by a base number (typically two) raised to the power of an exponent. The exponent and the significand are each represented using a defined set of bits in the format. A floating-point number is represented in this format by a fraction, where "1·fraction" is the significand and the "1" is not explicitly stored as part of the floating-point number, but is instead inferred from the exponent. A given floating-point format (such as 64-bit "double precision" (DP), 32-bit "single precision" (SP), or 16-bit "half precision" (HP)) uses biased exponents, meaning that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. The HP and DP formats work the same way, with biases of 15 and 1023 respectively. In consequence these formats can represent minimum true exponents of −1022 (DP), −126 (SP), and −14 (HP) respectively. A number which is smaller than these true exponents are able to represent is referred to as "subnormal" and must be represented by using the biased exponent zero, and a significand which is smaller than the above-mentioned "1·fraction" format. Very small numbers may occur in a variety of different data processing contexts, but one example would be the calculation of the difference between two operands which are very close in value.

SUMMARY

In one example embodiment described herein there is a data processing apparatus comprising:

bit comparison circuitry to perform a first comparison and a second comparison in dependence on a more significant portion of a first floating-point operand and of a second floating-point operand and to perform a third comparison of a less significant portion of the first floating-point operand and of the second floating-point operand, wherein the bit comparison circuitry comprises first comparison circuitry to compare the more significant portion of the first floating-point operand and of the second floating-point operand as the first comparison, and wherein the bit comparison circuitry comprises second comparison circuitry to compare a test value given by the more significant portion of the first floating-point operand minus a least significant bit in the more significant portion with the more significant portion of the second floating-point operand as the second comparison, wherein the bit comparison circuitry is responsive to either the first comparison or the second comparison revealing no difference and the third comparison revealing a difference in the less significant portion to generate a subnormal flag signal;

difference circuitry to calculate a difference between the first floating-point operand and the second floating-point operand; and right-shift circuitry to perform a 1-bit right shift on the difference calculated by the difference circuitry when the subnormal flag signal is generated by the bit comparison circuitry.

In another example embodiment described herein there is a method of operating a data processing apparatus comprising:

performing a first comparison and a second comparison in dependence on a more significant portion of a first floating-point operand and of a second floating-point operand, wherein performing the first comparison comprises comparing the more significant portion of the first floating-point operand and of the second floating-point operand, and wherein performing the second comparison comprises comparing a test value given by the more significant portion of the first floating-point operand minus a least significant bit in the more significant portion with the more significant portion of the second floating-point operand;

performing a third comparison of a less significant portion of the first floating-point operand and of the second floating-point operand;

generating a subnormal flag signal in response to either the first comparison or the second comparison revealing no difference and the second comparison revealing a difference in the less significant portion;

calculating a difference between the first floating-point operand and the second floating-point operand; and performing a 1-bit right shift on the difference calculated when the subnormal flag signal is generated.

In another example embodiment described herein there is a data processing apparatus comprising:

means for performing a first comparison and a second comparison in dependence on a more significant portion of a first floating-point operand and of a second floating-point operand, wherein performing the first comparison comprises comparing the more significant portion of the first floating-point operand and of the second floating-point operand, and wherein performing the second comparison comprises comparing a test value given by the more significant portion of the first floating-point operand minus a least significant bit in the more significant portion with the more significant portion of the second floating-point operand;

means for performing a third comparison of a less significant portion of the first floating-point operand and of the second floating-point operand;

means for generating a subnormal flag signal in response to either the first comparison or the second comparison revealing no difference and the second comparison revealing a difference in the less significant portion;

means for calculating a difference between the first floating-point operand and the second floating-point operand; and means for performing a 1-bit right shift on the difference calculated in response to the means for generating the subnormal flag signal generating the subnormal flag.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
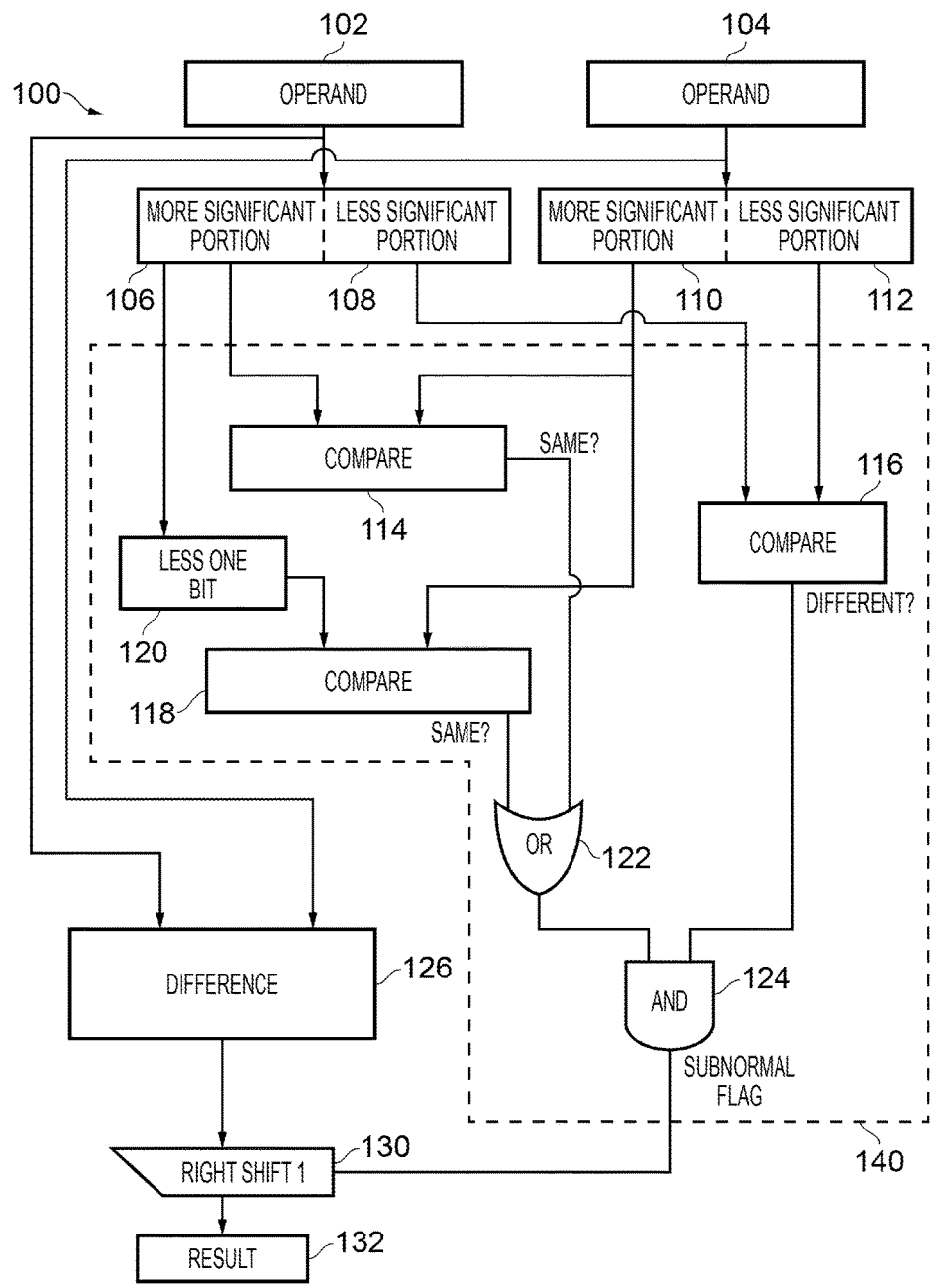
FIG. 1 schematically illustrates a data processing apparatus in accordance with one example.

Before discussing the embodiments with reference to the accompanying figures, the following description of embodiments is provided.

In accordance with one example configuration there is provided a data processing apparatus comprising bit comparison circuitry to perform a first comparison and a second comparison in dependence on a more significant portion of a first floating-point operand and of a second floating-point operand and to perform a third comparison of a less significant portion of the first floating-point operand and of the second floating-point operand, wherein the bit comparison circuitry comprises first comparison circuitry to compare the more significant portion of the first floating-point operand and of the second floating-point operand as the first comparison, and wherein the bit comparison circuitry comprises second comparison circuitry to compare a test value given by the more significant portion of the first floating-point operand minus a least significant bit in the more significant portion with the more significant portion of the second floating-point operand as the second comparison, wherein the bit comparison circuitry is responsive to either the first comparison or the second comparison revealing no difference and the third comparison revealing a difference in the less significant portion to generate a subnormal flag signal; difference circuitry to calculate a difference between the first floating-point operand and the second floating-point operand; and right-shift circuitry to perform a 1-bit right shift on the difference calculated by the difference circuitry when the subnormal flag signal is generated by the bit comparison circuitry.

In the context of floating-point operations in a data processing apparatus, the present techniques recognise that when a difference is calculated between a first floating-point operand and a second floating-point operand, there are circumstances in which the resulting difference may be very small, indeed so small that the resulting difference cannot be represented by the floating point format as a "normal" number, but rather must be represented as a "subnormal", i.e. where the minimum available exponent for the floating point format is used and a right shift of the significand is used to allow the number to be represented. Consequently, in a data processing apparatus which comprises difference circuitry to calculate a difference between two floating-point operands, the present techniques recognise that where this difference calculation is to be followed by an operation which makes the resulting value even smaller, such as a divide by 2 operation, that this subsequent operation cannot be implemented by means of an exponent decrement (since the minimum representable exponent has already been reached) and will need to be implemented by a right-shift applied to the result value. Accordingly, there is the need to detect when the result of the difference calculation has a minimal exponent and to then perform a right shift (to implement the divide by 2) when this has occurred and there may further be the need to perform the calculation of correct rounding information in all cases. In a contemporary data processing apparatus in which it is critical that such calculations are performed as quickly as possible (for example within one cycle), an approach which seeks to: predict the number of leading zeros in the difference, then compute the result exponent based on that difference, and then determine whether that exponent is minimum would itself consume much of the cycle leaving little or no time to do the right shift or any necessary rounding. Indeed, such a leading zero anticipation (LZA) approach can be off by one, so additional corrective or speculative logic is needed. Alternatively a parallelized approach in which a speculative shift and rounding computation is performed for both the subnormal and normal cases (and then the correct result and rounding information is chosen at the end of the cycle) would be possible. Whilst this method could make the timing it brings further complexities and the area cost is high.

Instead, in this context the present techniques recognise that an efficient identification of when the calculated difference will result in the minimum exponent can be provided by an approach which considers the first floating-point operand and the second floating-point operand in two portions, namely a more significant portion and a less significant portion. A condition has then been recognised in which the calculated difference will result in a minimum exponent. For this condition, in a first part the more significant portion of the first floating point operand and the more significant portion of the second floating operand are found to be equal. In a second the more significant portion of the first floating point operand minus a least significant bit in the more significant portion and the more significant portion of the second floating-point operand are equal. Thus the condition requires that one of these respective comparisons finds no difference. Where the first and second comparisons are made on more significant portions of the first and second floating point operands, it should be noted that finding no difference in these portions then corresponds to the first and second floating point operands being very close in value to one another, and therefore that the resulting difference subsequently calculated between them will be very small. Thus by appropriate choice of the definitions of the more significant portion and the less significant portion of the two floating-point operands, the cross-over point can be identified where a difference calculated between the two floating-point operands will result in a value which will require the use of the minimum exponent in the format. Additionally, the condition requires that in a third comparison, which compares the less significant portions of the first and second floating point operands, that a difference is found, such that there is a value which needs to be represented as subnormal using the minimum exponent and not that the first and second floating point operands are (at least as far as this format can represent) the same value. Thus when this condition is identified as being met the bit comparison circuitry generates a subnormal flag signal and right-shift circuitry which follows the difference circuitry then performs a 1-bit right shift on the difference calculated by the difference circuitry when then the subnormal flag signal is generated. Accordingly therefore a division by two can be implemented even though the minimum exponent has already been reached.

It should be understood that the choice of definition of the more significant portion and the less significant portion (in particular where the boundary lies between the two) will depend on the particular implementation, but in some embodiments the first floating-point operand and the second floating-point operand are represented in a defined floating-point format, and for an unrounded number with no bits set in the more significant portion, the defined floating-point format represents the unrounded number as subnormal with a minimum true exponent for the defined floating-point format.

The first floating-point and the second floating-point operand may be provided to the data processing apparatus in a variety of ways, in dependence on the context in which the difference circuitry is being used to calculate the difference between these two operands, however in some embodiments the first floating-point operand is a fixed predetermined number and the second floating-point operand is a variable number. It has been found that when one of the operands is a fixed predetermined number there are a number of ways in which efficiencies may be gained in performing the first, second, and third comparisons in the bit comparison circuitry, which may enable the determination of whether the difference between the first floating-point operand and the second floating-point operand will be subnormal to be particularly quickly determined.

For example, in some embodiments the first comparison circuitry comprises first bit-wise comparators to compare a first predetermined bit pattern representative of the more significant portion of the first floating-point operand with the more significant portion of the second floating-point operand as the first comparison, and wherein the second comparison circuitry comprises second bit-wise comparators to compare a second predetermined bit pattern representative of the test value with the more significant portion of the second floating-point operand as the second comparison. In other words therefore when the first floating-point operand is a fixed predetermined number the first and second comparison circuitry may be implemented as a set of bit-wise comparators to perform the first and second comparison. Predetermined bit patterns are held as a basis for the first and second comparisons respectively, enabling an efficient determination of whether the more significant portion of the second (variable) floating-point operand matches either the more significant portion of the first floating-point operand or the test value (given by the more significant portion of the first floating-point operand minus a least significant bit thereof). Accordingly therefore an efficient comparison may be performed against two stored bit patterns by means of a simple equality comparison between the more significant portion of the second floating point operand with each of those predetermined bit patterns.

Similarly, in some embodiments the bit comparison circuitry comprises third comparison circuitry to compare a third predetermined bit pattern representative of the less significant portion of the first floating-point operand with the less significant portion of the second floating-point operand as the third comparison. A similar efficient mechanism is thus provided in order to implement the third comparison. As in the case of the first and second comparisons therefore an efficient equality comparison between the third predetermined bit pattern and the less significant portion of the second (variable) floating-point operand is provided.

Nevertheless, it is further recognised that there are a variety of ways in which the less significant portions may be compared and in some embodiments the bit comparison circuitry comprises bit examination circuitry to identify whether any bits of the less significant portion of the second floating-point operand are set as the third comparison. The condition for generating the subnormal flag signal requires that the third comparison reveals a difference in the less significant portions of the first and second floating point operands and, when the first floating-point operand does not have any bits set in its less significant portion, the third comparison may be carried out by identifying whether any bits are set in the less significant portion of the second floating-point operand and without referring to the first floating-point operand. The first floating-point operand may be variously specified but in some embodiments the first floating-point operand is an integer. Integers have a relatively simple representation in floating-point format, meaning that when the first floating point operand is a fixed predetermined integer number the mechanisms provided to present that number within the bit comparison circuitry may be simplified.

For example in some embodiments the first floating-point operand is 3.0. This may for example find applicability in an instruction implementing a reciprocal square root step which computes $(3.0-x*y)/2.0$. In this context circuitry which can efficiently determine the difference for the calculation $3.0-x*y$ enables such a reciprocal square root step to be efficiently implemented and in particular in the context of the present techniques for situations in which the exponent reaches the minimum to be quickly identified so that the subsequent division by two can be carried out by the right shift (rather than by an exponent decrement as it would be if the minimum exponent had not yet been reached).

The second floating-point operand may take a variety of forms depending on the context in which the present techniques are implemented, but in some embodiments the apparatus further comprises multiplication circuitry to multiply a first input value and a second input value to produce the second floating-point operand. For example this may be the case when the above-mentioned reciprocal square root step is performed.

Accordingly, the present techniques may find particular applicability in the context of a data processing apparatus which carries out such a reciprocal square root step and indeed this may be in response to a dedicated instruction. Thus in some embodiments the data processing apparatus is responsive to a reciprocal square root step instruction specifying the first input value and the second input value to operate the multiplication circuitry, the bit comparison circuitry, the difference circuitry, and the right-shift circuitry.

As mentioned above, the present techniques find applicability for a range of floating-point formats, but may be of particular relevance in the context of floating-point formats which have a limited range of exponents that can be expressed such that the subnormal format is encountered. This may for example be the case for a half-precision floating-point format and thus in some embodiments the defined floating-point format is a 16-bit half-precision floating-point format.

The present techniques may find applicability in a range of data processing apparatuses, provided in a variety of ways, but some such data processing apparatuses may be provided with near path circuitry and far path circuitry, wherein a particular computation will follow one of these paths in dependence on the exponent of the second floating-point operand. Large exponents follow the far path, whilst smaller exponent values of the second floating point operand follow the near path. Accordingly, some embodiments may comprise near path circuitry and far path circuitry each to calculate a rounded result obtained by performing a division-by-two on the difference between the first floating-point operand and the second floating-point operand, wherein the far path circuitry comprises exponent decrement circuitry to perform the division-by-two as an exponent decrement, and wherein the near path circuitry comprises the difference circuitry and the right-shift circuitry.

In accordance with another example configuration there is provided a method of operating a data processing apparatus comprising performing a first comparison and a second comparison in dependence on a more significant portion of a first floating-point operand and of a second floating-point operand, wherein performing the first comparison comprises comparing the more significant portion of the first floating-point operand and of the second floating-point operand, and wherein performing the second comparison comprises comparing a test value given by the more significant portion of the first floating-point operand minus a least significant bit in the more significant portion with the more significant portion of the second floating-point operand; performing a third comparison of a less significant portion of the first floating-point operand and of the second floating-point operand; generating a subnormal flag signal in response to either the first comparison or the second comparison revealing no difference and the second comparison revealing a difference in the less significant portion; calculating a difference between the first floating-point operand and the second floating-point operand; and performing a 1-bit right shift on the difference calculated when the subnormal flag signal is generated.

In accordance with another example configuration there is provided a data processing apparatus comprising means for performing a first comparison and a second comparison in dependence on a more significant portion of a first floating-point operand and of a second floating-point operand, wherein performing the first comparison comprises comparing the more significant portion of the first floating-point operand and of the second floating-point operand, and wherein performing the second comparison comprises comparing a test value given by the more significant portion of the first floating-point operand minus a least significant bit in the more significant portion with the more significant portion of the second floating-point operand; means for performing a third comparison of a less significant portion of the first floating-point operand and of the second floating-point operand; means for generating a subnormal flag signal in response to either the first comparison or the second comparison revealing no difference and the second comparison revealing a difference in the less significant portion; means for calculating a difference between the first floating-point operand and the second floating-point operand; and means for performing a 1-bit right shift on the difference calculated in response to the means for generating the subnormal flag signal generating the subnormal flag.

Floating-point (FP) is a useful way of approximating real numbers using a small number of bits. The IEEE 754-2008 FP standard proposes multiple different formats for FP numbers. Some of these include binary 64 (also known as double precision, or DP), binary 32 (also known as single precision, or SP), and binary 16 (also known as half precision, or HP). The numbers 64, 32, and 16 refer to the number of bits required for each format.

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

| format | sign | exponent | Fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$-1^{sign} \times 1 \cdot \text{fraction} \times 2 0^e$ where e is the true exponent computed from the biased exponent. The term 1·fraction is called the significand, and the 1 is not stored as part of the FP number, but is instead inferred from the exponent. All exponents except zero and the maximum exponent indicate a significand of the form 1·fraction. The exponent zero indicates a significand of the form 0·fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| Sign | 5-bit exponent | 10-bit fraction | 11-bit significand | value |
|------|----------------|-----------------|--------------------|-------|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software.

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001
−1=1001

In two's complement representation, an n-bit integer i is represented by the low order n bits of the binary n+1-bit value $2^n+i$, so a 4-bit two's complement integer would represent plus and minus one as:

+1=0001
−1=1111

The two's complement format is practically universal for signed integers because it simplifies computer arithmetic.

Particular embodiments will now be described with reference to the figures.

FIG. 1 illustrates a data processing apparatus 100 in accordance with one embodiment. The data processing apparatus 100 receives two operands 102 and 104 in floating-point format. The data processing apparatus treats these operands each in two parts, namely a more significant portion and a less significant portion. Hence, each received operands 102 and 104 is respectively handled as a more significant portion 106, 110 and a less significant portion 108, 112 respectively. Bit comparison circuitry 140 is provided in the data processing apparatus of which comparison circuitry 114 compares the two more significant portions 106 and 110 to determine if they are equal and generates a signal indicative of this. Similarly the comparison circuitry 116 compares the less significant portions 108 and 112 to determine if they are equal or not and generates a signal indicative of this. Note that specifically where the comparison circuitry 114 is labelled with the output "same?" the signal is asserted when the two more significant portions match, whilst where the output signal is labelled "different?" for the comparison circuitry 116, the output signal is asserted when the two less significant portions 118 and 112 differ in some way. The data processing apparatus 100 also comprises comparison circuitry 118 which receives more significant portion 110 of the operands 104 and a modified version of the more significant portion 106 of the operands 102, in that a least significant bit has been subtracted (by means of circuitry 120) from this portion. The comparison circuitry 118 then performs a comparison to determine if this modified version of the more significant portion 106 and the more significant portion 110 are the same or not. When they are the output signal ("same?") is asserted. The bit comparison circuitry of the processing apparatus 100 further comprises OR gate 122 and AND gate 124 which combine the signals from the respective comparison circuitries in order to generate the subnormal flag. The subnormal flag is only generated when the more significant portion 100 matches either the more significant portion 106 or the modified (less one bit) version and when the comparison circuitry 116 indicates that the less significant portions 108 and 112 differ in some way. The data processing apparatus 100 also comprises the different circuitry 126 which calculates the difference between the operands 102 and 104. The output of the difference circuits 126 is received by the right shift circuitry 130 which, when the subnormal flag is asserted, applies a one bit right shift to this output. Where the floating-point format of these numbers is a binary representation with power of two exponents, this right shifting selectively divides the results by two. This result 132 is then forwarded as required.

Figure 2:
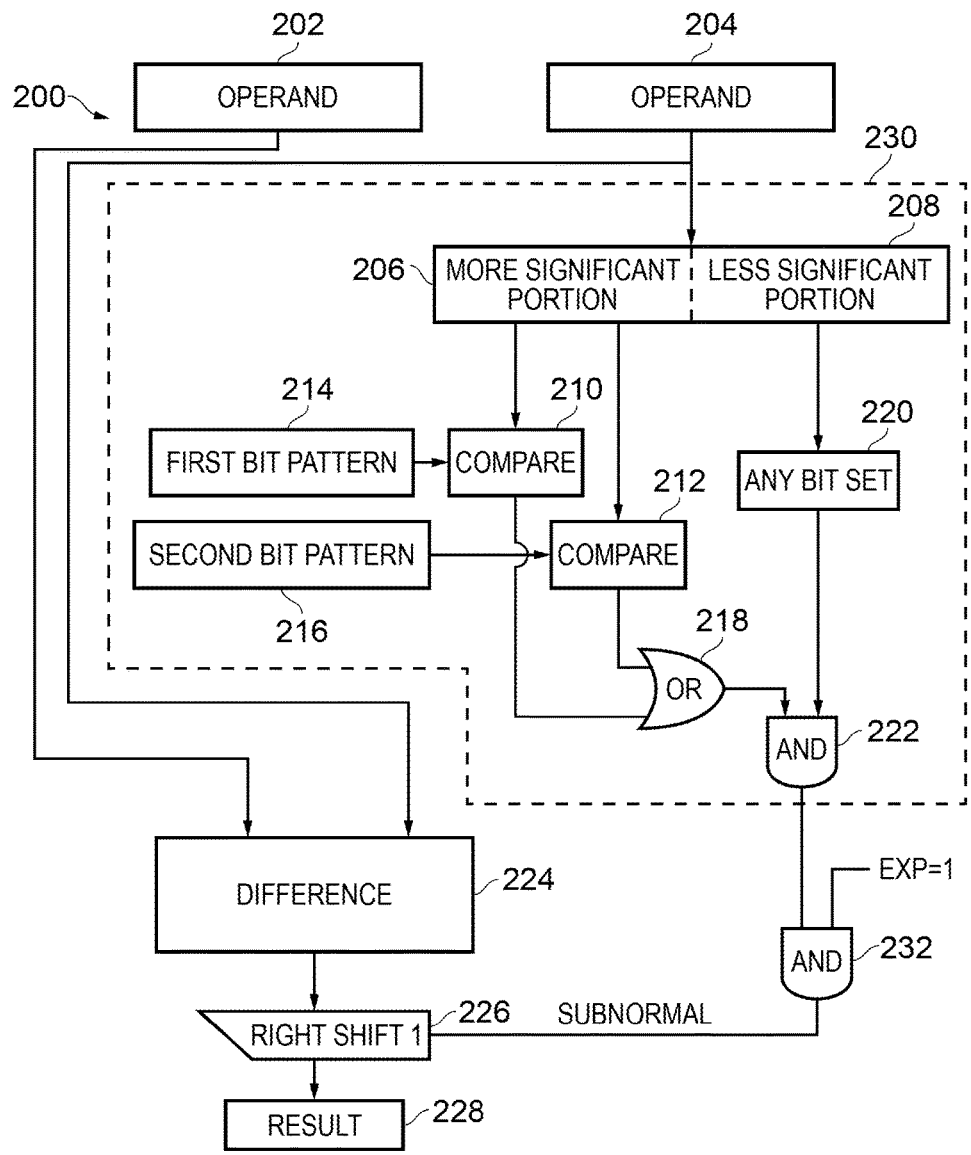
FIG. 2 schematically illustrates a data processing apparatus in accordance with one example.

FIG. 2 schematically illustrates a data processing apparatus 200 in one embodiment. This data processing apparatus 200 also performs data processing on two operands 202 and 204, but as is apparent from FIG. 2, only the second operand 204 provides an input to the bit comparison circuitry 230, whilst the first operand only provides an input to the difference circuitry 224. This is due to the fact that in this embodiment the operand 202 is in fact provided as a fixed input to the data processing apparatus and therefore the bit comparison circuitry has been configured in a predetermined way to perform bit pattern comparisons on the basis of that known predetermined fixed input. As in the example of FIG. 1 the second floating-point operand 204 is handled in two portions, namely the more significant portion 206 and its less significant portion 208. The more significant portion 206 is received by two sets of comparison circuitry 210 and 212, which are arranged to compare whether this more significant portion 206 is equal to a first bit pattern 214 or a second bit pattern 216 respectively. The outputs of comparison circuitry 210 and 212 provide the inputs to the OR gate 218. The less significant portion 208 is examined to determine if any bit is set by circuitry 220, which asserts its output when any bit of that less significant portion 208 is set. The output of the OR gate 218 and the bit examination circuitry 220 form the two inputs to the AND gate 222, such that a subnormal flag is the output of the AND gate 222. As in the example of FIG. 1, difference circuitry 224 calculates the difference between the operands 202 and 204 and when the subnormal flag is asserted the right shift circuitry 226 performs a one-bit right shift on its output. Note that in this example a further AND gate 232 is provided, such that for the right-shift to be performed the subnormal flag from the bit comparison circuitry 230 must be asserted and the exponent must be one. This ensures that the operand 202 does indeed match the defined fixed input for which the first and second bit patterns have been set up. The result 228 is made use of, forwarded as appropriate.

The use of predetermined first and second bit patterns in the bit comparison circuitry in the case of the data processing apparatus which uses a known first floating-point operand will now be explained further with reference to Table 1 below which represents an example where a fixed first floating-point operand of 3.0 is used and the second, variable floating point operand is represented by x*y (since in this example this operand is the product of two previous operands x and y).

TABLE 1

| | | | | | | | | | | | Right shift cases | | | | | | | | | | | |
|---|---|---|---|---|---|---|---|---|---|---|---|---|---|---|---|---|---|---|---|---|---|---|
| sig [21:0] | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| true exp | 1 | 0 | −1 | −2 | −3 | −4 | −5 | −6 | −7 | −8 | −9 | −10 | −11 | −12 | −13 | −14 | −15 | −16 | −17 | −18 | −19 | −20 |
| RS if diff | 0 | 0 | 0 | 0 | 0 | 0 | 0 | 0 | 0 | 0 | 0 | 0 | 0 | 0 | 0 | X | X | X | X | X | X | X |
| x * y > 3.0 | 1 | 1 | 0 | 0 | 0 | 0 | 0 | 0 | 0 | 0 | 0 | 0 | 0 | 0 | 0 | X | X | X | X | X | X | X |
| 3.0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| x * y − 3.0 | 0 | 0 | 0 | 0 | 0 | 0 | 0 | 0 | 0 | 0 | 0 | 0 | 0 | 0 | 0 | X | X | X | X | X | X | X |
| 3.0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| x * y < 3.0 | 1 | 0 | 1 | 1 | 1 | 1 | 1 | 1 | 1 | 1 | 1 | 1 | 1 | 1 | 1 | Y | Y | Y | Y | Y | Y | Y |
| x * y − 3.0 | 0 | 0 | 0 | 0 | 0 | 0 | 0 | 0 | 0 | 0 | 0 | 0 | 0 | 0 | 0 | Z | Z | Z | Z | Z | Z | Z |

Numbers in the neighbourhood of 3.0 have a true exponent of 1 (represented in this format as 21). The exact significand representing 3.0 with exponent 1 is shown in two locations on the table (labelled 3.0 in the left-hand column), with a 1 in sig[21] representing 2 and a 1 in sig[20] representing 1 (3=2+1). Since those rows represent exactly 3 no other bits are set.

A product x*y which is near 3.0 (but slightly greater than 3.0) is shown in the middle rows of the table, labelled x*y>3.0 in the left-hand column. As long as at least one of the bits labelled X is a one, then the difference labelled x*y−3.0 will be a value with a true exponent less than or equal to −14 (and hence will require a right shift to implement a divide by 2).

A product x*y which is near 3.0 (but slightly smaller than 3.0) is shown in the last 3 rows of the table, labelled x*y<3.0 in the left-hand column. As long as at least one of the bits labelled Y is a one, then the difference labelled x*y−3.0 is going to be a value with a true exponent less than or equal to −14 (and hence will require a right shift to implement a divide by 2). The difference is Z[7:0]=−Y[6:0]=~Y[6:0]+1 (where "~Y" is using the Verilog representation, i.e. the inverted bits (2's complement) version of Y).

Hence, in a data processing apparatus which receives a known first floating-point operand of 3.0 and a second, variable floating point operand represented by x*y, then detecting one of these subnormal results for the difference x*y−3.0 requires examining the product, making sure the exponent is 1, and then looking for one of the two bit patterns (row x*y>3.0 or row x*y<3.0).

Figure 3:
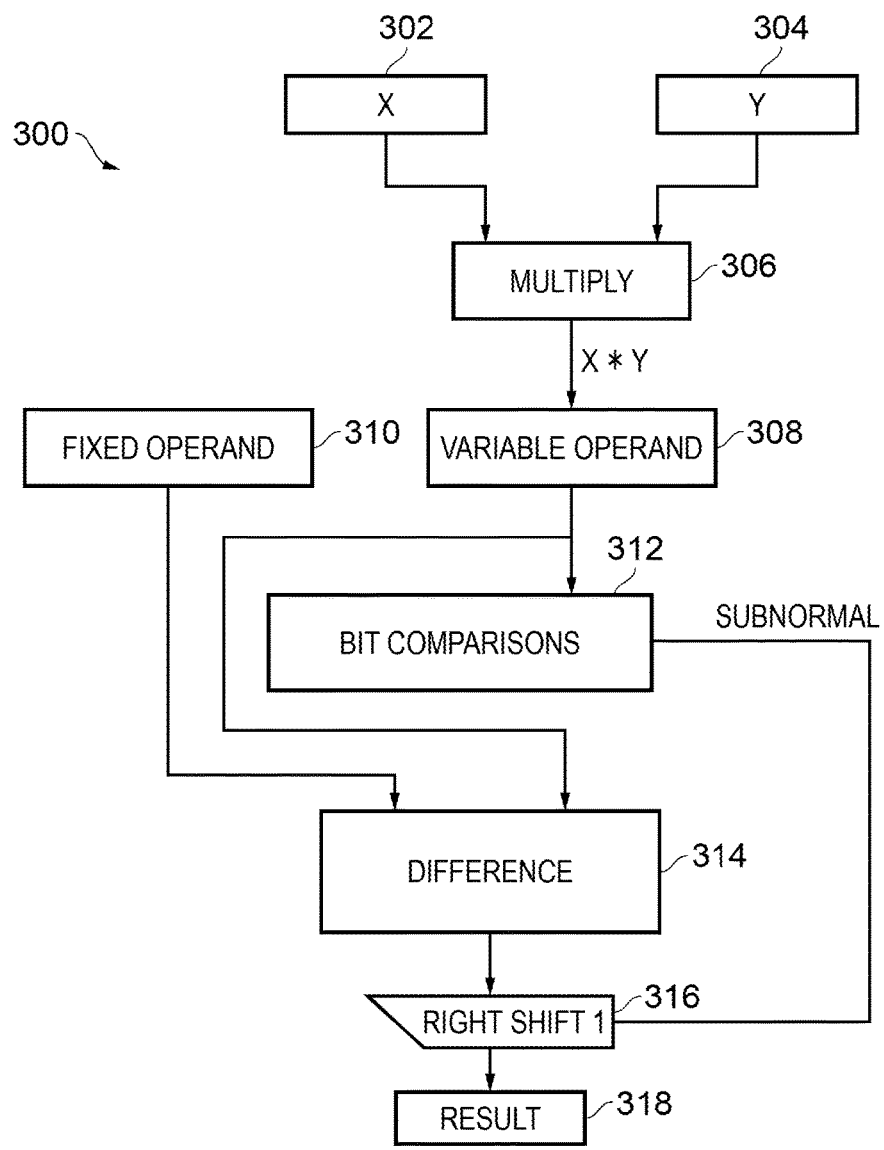
FIG. 3 schematically illustrates a data processing apparatus in accordance with one example.

FIG. 3 schematically illustrates a data processing apparatus 300 in one embodiment. In a first stage input operands x and y (labelled 302 and 304 respectively) are received by multiplication circuitry 306 which generates their product as its output and this forms the variable operand 308. A fixed floating-point operand 310 is also provided. Where a fixed floating point operand 310 is used the bit comparison circuitry may be provided as described above in order to compare the more significant portion of the variable floating-point operand 308 against two predetermined bit patterns. An examination of the less significant portion of floating-point variable operand 308 is also performed in order to determine if any of these bits are set. On this basis, the bit comparison circuitry 312 generates the subnormal flag. The fixed predetermined floating point operand 310 and the variable floating-point operand 308 form the two inputs into the difference circuitry 314 which calculates the difference between these two floating-point numbers. When the subnormal flag is set, the right shift circuitry 316 performs a one-bit right shift on the calculated difference (in order to implement a divide by two). The result 318 is then forwarded as required.

Figure 4:
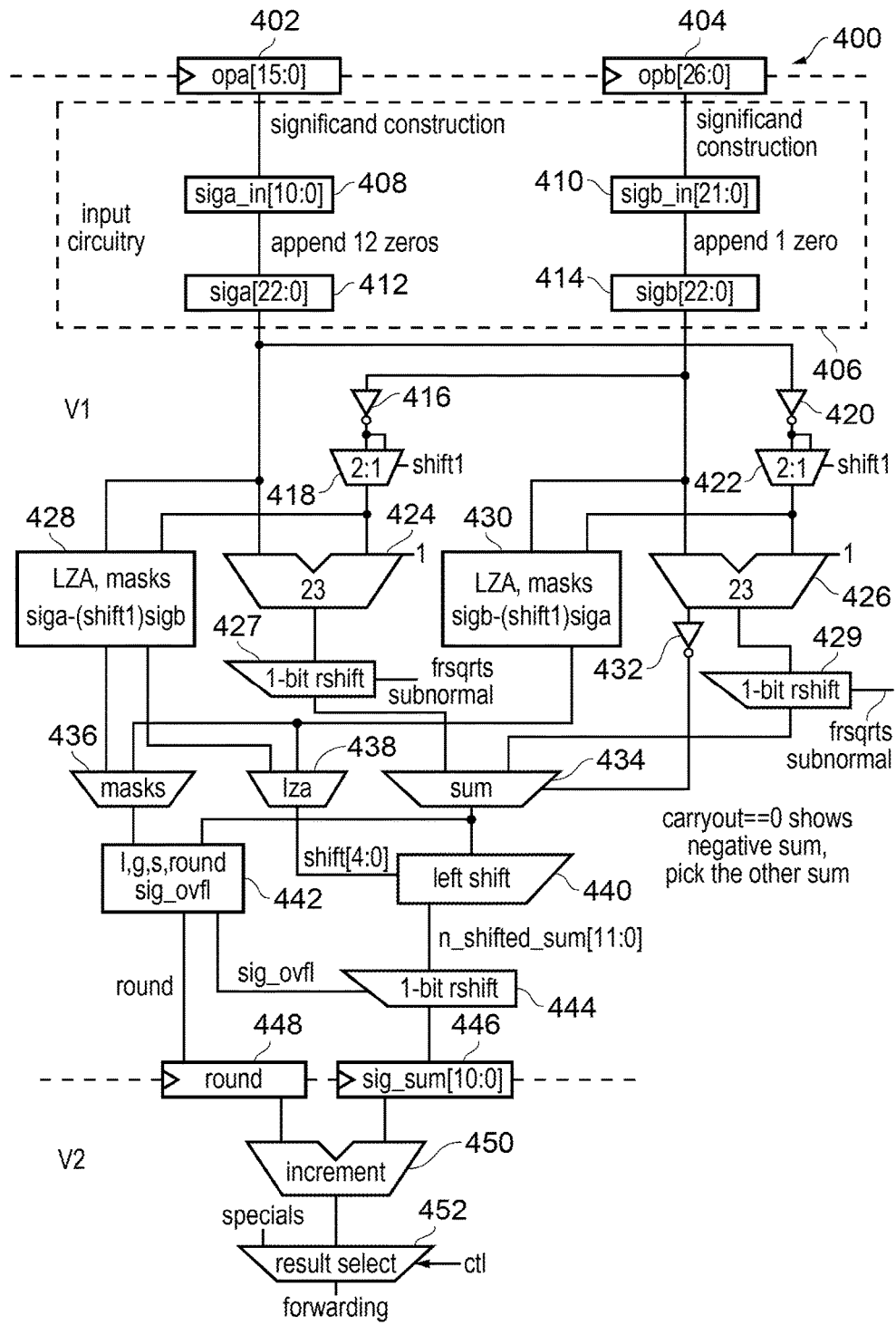
FIG. 4 is a diagram illustrating an apparatus used to subtract significand values of floating-point operands, in accordance with one example.

FIG. 4 schematically illustrates data processing apparatus in one embodiment. In particular, FIG. 1 shows an example configuration of significand processing logic that may be provided as part of the near path circuitry of a processor. Two operands 402, 404 are received in the storage elements 402, 404 of input circuitry. In the particular example considered here, operand A is a 16-bit value representing a half-precision (HP) number, whilst operand B is a 27-bit value representing an unrounded HP product produced from a multiplier as part of a fused multiply-add (FMA) operation. In accordance with this format, the sign bit is bit 26, the exponent is formed by bits 25 through 21, and the fraction portion is formed by bits 20 to 0. Accordingly, operand B is essentially an HP number with a much wider fraction. In situations where the apparatus is not being used to perform FMA operations, and instead is performing a standard subtraction of two HP numbers, the high-order 13-bits of operand B (i.e. bits 24 to 11) are used to represent the HP number, and the bottom 11 bits (i.e. bits 10 to 0) are all set to 0.

The input circuitry 406 is used to construct the significand of each operand from the value stored in the elements 402, 404. In each case, the fraction bits are extracted, and then an implicit 1 bit is added at the most significant bit position assuming the operand is considered to be a normal floating-point operand, or instead a logic 0 value is added at the most significant bit position if the floating-point operand is considered to be a subnormal value. To assess this, each of the exponent bits of each operand can be evaluated to determine whether they are non-zero. Non-zero exponent values imply normal significands, so that they begin with an implicit 1. In contrast, if the exponent value is 0, this will be considered to be a subnormal operand, and an implicit 0 will be added as the most significant bit of the significand.

Accordingly, by virtue of this process, it will be seen that initial significand values 408, 410 are created by extracting the fraction bits, and prepending a 1 or a 0 dependent on whether the operand is considered to be normal or subnormal. Further, the input circuitry is arranged to pad the significand of operand A with 0s to make it the same length as the significand of operand B, and both significands are then padded with one additional bit so as to ensure that no information is lost if the smaller significand is right-shifted by one bit. Hence, it can be seen that the significands denoted by the elements 412, 414 may be constructed as follows for normal operands:

fraca[9:0]=opa[9:0]
fracb[20:0]=opb[20:0]
siga[22:0]={implicit one bit, fraca[9:0], 12 zeros bits}
sigb[22:0]={implicit one bit, fracb[22:0], 1 zero bit}

Figure 5A:
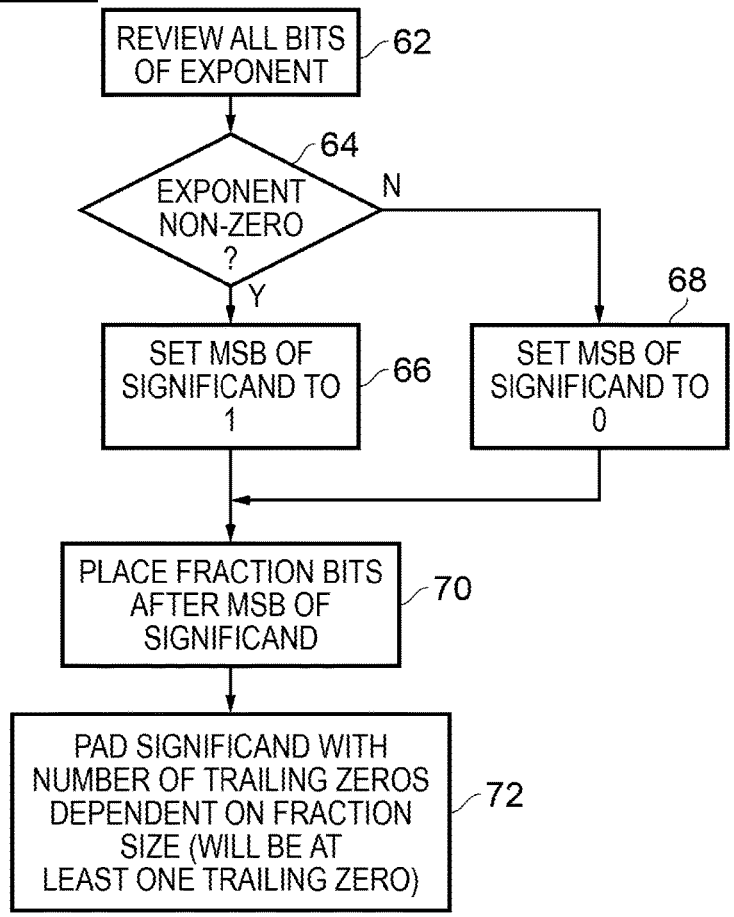
FIG. 5A is a flow diagram illustrating how the input circuitry of FIG. 4 is used in one example to create the significand values processed by the remainder of the apparatus.

FIG. 5A is a flow diagram illustrating the above described significand creation process performed by the input circuitry 406. In particular, the process of FIG. 5A is performed for each input operand. At step 62, all bits of the exponent value of the operand are reviewed in order to determine whether the exponent is non-zero. If at step 64 it is determined that the exponent is non-zero, then the most significant bit of the significand is set to 1 at step 66, whereas otherwise the most significant bit of the significand is set to 0 at step 68.

Following steps 66 or 68, then the fraction bits of the operand are placed after the most significant bit of the significand at step 70. At step 72, the significand is then padded with a number of trailing 0s dependent on the fraction size. As will be apparent from the above discussion there will be at least one trailing 0 added, which ensures that no information will be lost if that significand is subsequently subjected to a one bit right shift.

The circuitry in FIG. 4 begins the near-path subtraction operation without knowing which floating-point operand is larger. The circuitry is required to produce a non-negative difference, and hence uses two adder circuits 424, 426 to perform the two subtractions, siga−sigb and sigb−siga. However, as will be apparent from the earlier discussion, if the exponents differ by one, it will be necessary to right shift the smaller significand so that the exponents can be made equal, and at the start of the process it is not known whether the exponents differ by 0 or 1.

As shown in FIG. 4, each of the adder circuits 424, 426 is used in combination with associated inverters 416, 420 to perform twos complement addition, so that the second input to the adder is inverted, and the adder receives a carry in value of 1. As a result, the adders perform an effective subtraction of the two input significands.

As further shown, the output from the inverters 416, 420 is used to generate two inputs to the multiplexers 418, 422, namely the original inverted value, and a 1-bit right-shifted version of the inverted value. One of those values is then selected for propagation as the second input to the associated adder circuitry 424, 426 in dependence on the shift1 control signal.

Figure 5B:
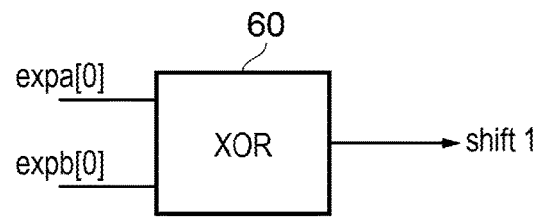
FIG. 5B illustrates circuitry that may be used to generate the "shift1" signal used by the apparatus of FIG. 4 in accordance with one example.

In the described example, the shift1 control signal is evaluated by comparing the least significant bit of the exponent values of both input operands, and in particular by performing an XOR operation 60 as shown in FIG. 5B. Hence, it can be seen that the exponents are evaluated for this purpose as follows:

expa[4:0]=opa[15:10]
expb[4:0]=opb[22:26]
shift1=expa[0]^expb[0]

Accordingly, if the shift one control signal is not asserted, the unshifted version will be forwarded as the second input for the adders, whilst if the shift1 signal is asserted, the 1-bit right-shifted version will be provided as the second input to the adders. Hence, it will be seen that the two adder circuits 424, 426 perform the following computations respectively:

diff1=siga[22:0]−(possibly 1-bit right shifted) sigb[22:0] and diff2=sigb[22:0]−(possibly 1-bit right shifted) siga[22:0]

Hence it will be seen that, by producing the shift1 signal, it is possible to reduce the number of potential subtraction operations required from four to two, since it can be determined whether the significand value being subtracted from the other significand value needs to be 1-bit right shifted or not.

As mentioned earlier, it is required that a non-negative difference is produced. This can readily be determined once the first and second difference values have been computed, by reviewing the carry-out information from one of the adders. In particular, when computing X−Y, the carry-out value will be set to 1 if X is greater than or equal to Y, and the difference X−Y is thus non-negative (i.e. it is either positive or 0). In the example shown in FIG. 4, the carry-out from the second adder 426 is inverted by the inverter 432 and used as the control signal for the multiplexer 434 that is arranged to choose between the first and second difference values. Accordingly, if the second difference value is non-negative, it will be selected by the multiplexer (in this example a logic 0 control signal to the multiplexer 434 causes the right-hand input to be selected), whereas otherwise the first difference value will be selected.

In addition, and in accordance with the techniques disclosed herein, FIG. 4 also shows two items of 1-bit right selective 1-bit right shift circuitry 427, 429 which respectively receive the outputs of the corresponding adder circuit 424, 426. These 1-bit right selective 1-bit right shift circuitries 427, 429 are controlled in dependence on a signal indicating that a "FRSQRTS" (reciprocal square root step) instruction is being executed and the above discussed "subnormal" signal generated by bit comparison circuitry (not shown in FIG. 4) to indicate that the respective difference determined by adder circuit 424, 426 is very small, and indeed is so small that the 1-bit right shift should be invoked in order to implement the divide-by-two required for the reciprocal square root step instruction (since it cannot be implemented by an exponent reduction). The outputs of the corresponding adder circuit 424, 426 are thus selectively 1-bit right shifted before providing the inputs to the multiplexer 434.

In parallel with the operations of the adder circuits 424, 426, shift estimation circuits 428, 430 are provided to compute a leading zero anticipation (LZA) value and one or more mask values by analysing the significand values that are actually input to the associated adder circuits 424, 426. Hence, each of the shift estimation circuits 428, 430 will receive the significand value provided as a first input to the corresponding adder circuit 424, 426, and also the significand value provided as the second input to the corresponding adder circuit 424, 426, which as discussed earlier may be the original non-shifted value or a 1-bit right shifted value, dependent on the value of the shift1 control signal.

Each shift estimation circuit 428, 430 is arranged to generate an LZA value used to identify an estimated left shift amount to apply to the associated difference value in order to normalise it, and also to generate one or more mask values that can be used during rounding determination, and also to detect a significand overflow condition. The LZA values from each shift estimation circuit 428, 430 are forwarded as inputs to the multiplexer 438, whilst the masks produced by both estimation circuits 428, 430 are provided as inputs to the multiplexer 436. The multiplexers 436, 438 can be driven by the same control signal used by the multiplexer 434, so as to select appropriate LZA and mask values dependent on which difference value is selected by the multiplexer 434.

A detailed description of the operation of the shift estimation circuits 428, 430 is not required here for an understanding of the disclosed techniques. However, as schematically shown in FIG. 4, in this example the shift estimation circuits can be arranged so that they can produce the LZA and mask information in parallel with the generation of the difference values by the adders 424, 426.

The chosen difference value selected by the multiplexer 434 is provided as an input to the left shift circuitry 440, which also receives from the multiplexer 438 the corresponding estimated left shift amount produced by the relevant shift estimation circuit 428, 430. The input value is then left shifted by the LZA value provided by the multiplexer 38 in order to produce a shifted difference value that is input to the selective 1-bit right shift circuitry 444.

The mask information from the relevant shift estimation circuit 428, 430 is routed from the multiplexer 436 to the round and significand overflow circuitry 442. A detailed description of the operation of this circuitry is not required here for an understanding of the disclosed techniques, but in essence it uses the mask information and the chosen difference value selected by the multiplexer 434 to detect a significand overflow condition, and in that instance to send a control signal to the 1-bit right shift logic 444 to cause the output from the left shift circuitry to be subjected to a corrective 1-bit right shift in the presence of a significand overflow. Otherwise, the output from the left shift circuitry is passed unchanged through the right-shift circuitry 444. The resulting difference value is stored within the storage element 446. In particular, the most significant 11-bits are stored within the storage element 446.

The circuitry 442 also evaluates the mask information in order to determine whether to insert a rounding bit at a logic 1 value or at logic 0 value, with the determined rounding bit being stored within the storage element 448. This hence enables the rounding bit to be set appropriately having regards to the appropriate rounding mode, so that that rounding bit can then subsequently be added to the value stored in the storage element 446 by the increment circuitry 450 in order to produce the rounded result provided as one input to the result selection multiplexer 452.

In accordance with standard mechanisms, separate circuitry can be used to detect certain special conditions, for example where the result is a NaN (not a number), a value of infinity, etc. The result selection multiplexer 452 can then be driven by an appropriate control signal (ctl) to either select the output from the increment circuitry 450, or one or more special values, with the output being a final result of the difference computation performed in respect of the significands, which can then be forwarded to other components within the processor.

As shown in FIG. 1, the majority of the computation can be performed in a single clock cycle. Further, most of the second clock cycle is available for forwarding, because the 11-bit increment and 2-input mux processing illustrated consumes less than a quarter of the cycle in one illustrative example configuration.

In situations where rounding is not required, then it is possible to perform the entire significand processing operation in a single cycle in some implementations. For example, in an implementation that does not support FMA additions, then the 23-bit adders and shift estimation circuits in the first processing stage can be replaced by faster and smaller 12-bit units, and no rounding is required so that the second cycle processing step shown become unnecessary. This can enable HP near-path add/subtract operations to be performed in less than a single cycle.

Figure 6:
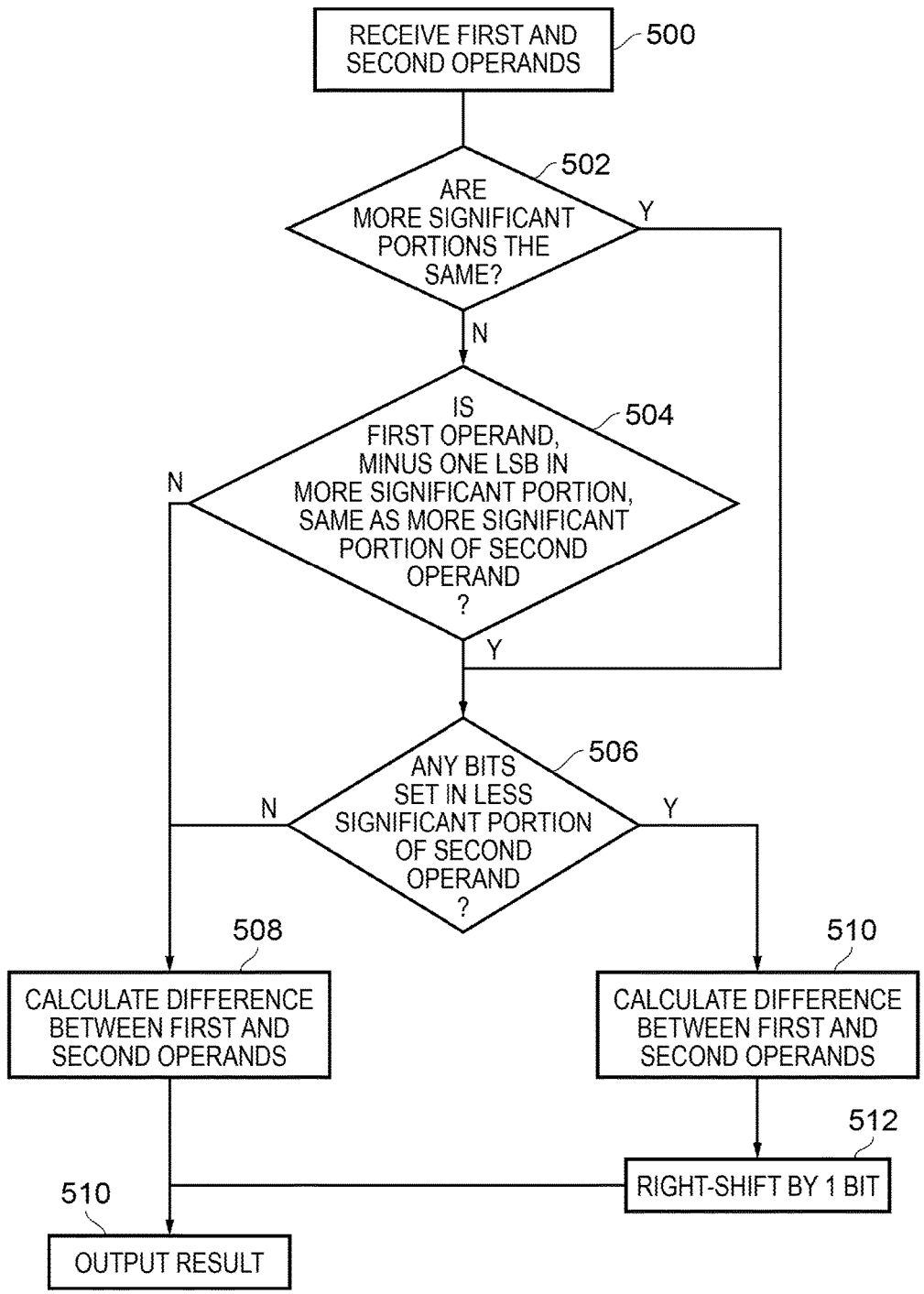
FIG. 6 shows a sequence of steps carried out in accordance with one example.

FIG. 6 shows a sequence of steps which are taken in one embodiment in order to carry out a method of operating a data processing apparatus. In a first step 500, first and second-floating point operands are received. It is then determined at step 502 if the more significant portions of each operand are equal. If they are not then the flow proceeds to step 504 where it is determined if the first operand minus one least significant bit in its more significant portion is the same as the more significant portion of the second operand. If this is the case then flow proceeds to step 506. If at step 502 it is determined that the more significant portions are not the same then the flow proceeds directly to step 506. At step 506 it is determined if there are any bits set in the less significant portion of the second operand. If they are not then the flow proceeds to step 508. Also, if the condition is not true at 504 then the flow proceeds to 508. At step 508 the difference between the first and second operands is calculated and then output at step 510. If it is found at step 506 that there are bits set in the less significant portion of the second operand then the flow proceeds to step 510 where the difference between the first and second operands is also calculated but this is then followed by 512 which performs a one bit right shift on the result before this is output at a step 510.

Figure 7:
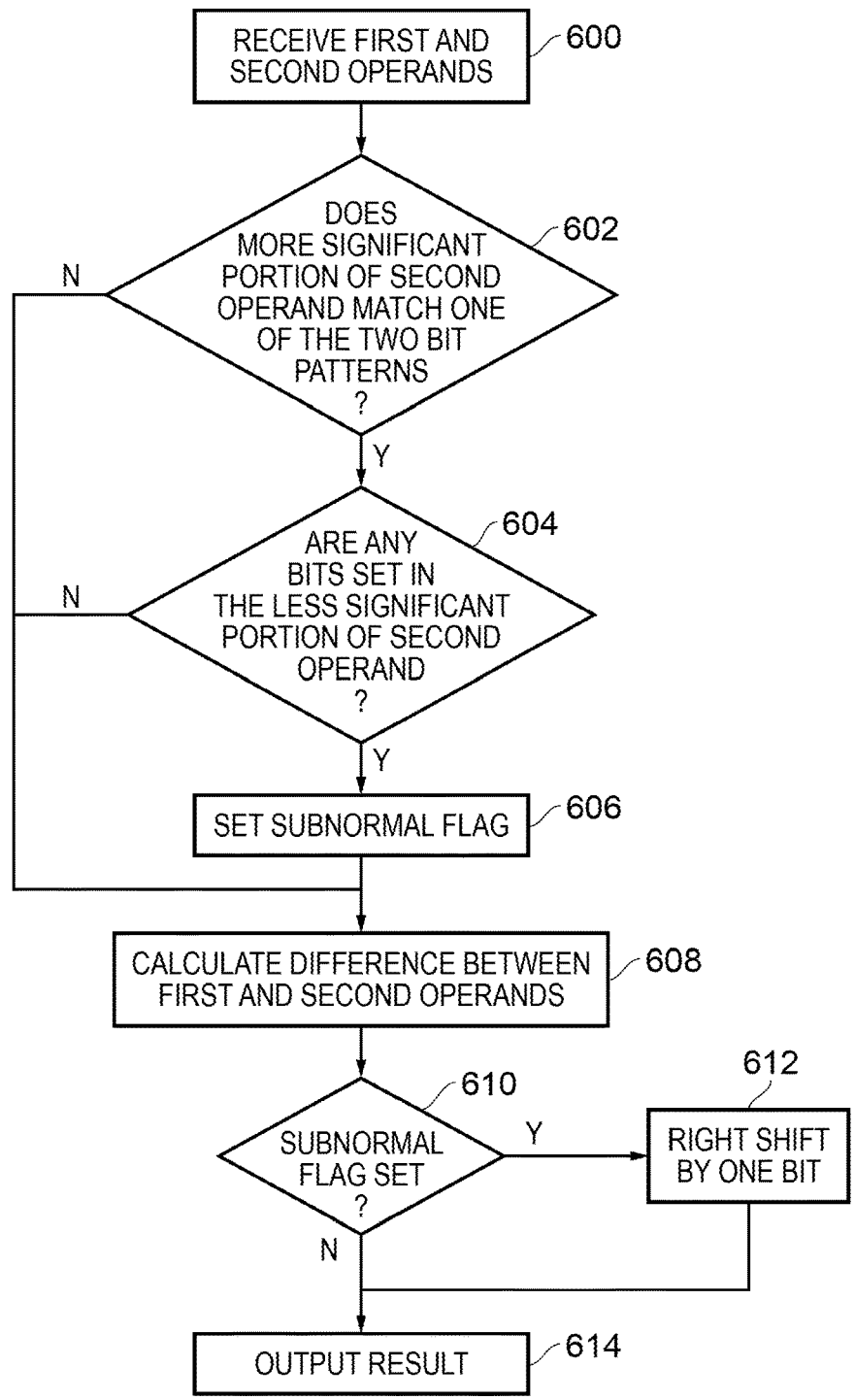
FIG. 7 shows a sequence of steps carried out in in accordance with one example.

FIG. 7 shows a sequence of steps which are taken in the method of one embodiment. At step 600 the first and second operands are received and then at step 602 it is determined if the more significant portion of the second operand matches one of two stored predetermined bit patterns. If it does then the flow proceeds to step 604 where it is determined if there are any bits set in the less significant portion of the second operand. If this is true then the subnormal flag is set at step 606. Thereafter the flow proceeds to step 608 where the difference between the first and second operands is calculated. If the conditions tested at either of step 602 or 604 are not fulfilled then the flow proceeds directly to step 608. Thereafter at 610 it is determined if the subnormal flag has been set and if it has the result is right shifted by one bit at step 612 before the result is output at step 614. Otherwise if the subnormal flag is not set then the flow proceeds directly from step 610 to output the result at step 614.

In brief overall summary a data processing apparatus and method of operating a data processing apparatus are disclosed. Comparisons are made between first and second floating-point operands received. A more significant portion of the first floating-point operand and of the second floating-point operand are subject to comparison. The more significant portion of the first floating-point operand minus a least significant bit in the more significant portion is subject to comparison with the more significant portion of the second floating-point operand. A less significant portion of the first floating-point operand and of the second floating-point operand are also subject to comparison. In dependence on the outcome of these comparisons, right-shift circuitry is used selectively to perform a 1-bit right shift on a difference calculated between the first floating-point operand and the second floating-point operand.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
   bit comparison circuitry to perform a first comparison and a second comparison in dependence on a more significant portion of a first floating-point operand and of a second floating-point operand and to perform a third comparison of a less significant portion of the first floating-point operand and of the second floating-point operand,
   wherein the bit comparison circuitry comprises first comparison circuitry to compare the more significant portion of the first floating-point operand and of the second floating-point operand as the first comparison,
   and wherein the bit comparison circuitry comprises second comparison circuitry to compare a test value given by the more significant portion of the first floating-point operand minus a least significant bit in the more significant portion with the more significant portion of the second floating-point operand as the second comparison,
   wherein the bit comparison circuitry is responsive to either the first comparison or the second comparison revealing no difference and the third comparison revealing a difference in the less significant portion to generate a subnormal flag signal;
   difference circuitry to calculate a difference between the first floating-point operand and the second floating-point operand; and
   right-shift circuitry to perform a 1-bit right shift on the difference calculated by the difference circuitry when the subnormal flag signal is generated by the bit comparison circuitry.

2. The data processing apparatus as claimed in claim 1, wherein the first floating-point operand and the second floating-point operand are represented in a defined floating-point format, and wherein for an unrounded number with no bits set in the more significant portion, the defined floating-point format represents the unrounded number as subnormal with a minimum true exponent for the defined floating-point format.

3. The data processing apparatus as claimed in claim 2, wherein the defined floating-point format is a 16-bit half-precision floating-point format.

4. The data processing apparatus as claimed in claim 1, wherein the first floating-point operand is a fixed predetermined number and the second floating-point operand is a variable number.

5. The data processing apparatus as claimed in claim 4, wherein the first comparison circuitry comprises first bit-wise comparators to compare a first predetermined bit pattern representative of the more significant portion of the first floating-point operand with the more significant portion of the second floating-point operand as the first comparison,
   and wherein the second comparison circuitry comprises second bit-wise comparators to compare a second predetermined bit pattern representative of the test value with the more significant portion of the second floating-point operand as the second comparison.

6. The data processing apparatus as claimed in claim 5, wherein the bit comparison circuitry comprises third comparison circuitry to compare a third predetermined bit pattern representative of the less significant portion of the first floating-point operand with the less significant portion of the second floating-point operand as the third comparison.

7. The data processing apparatus as claimed in claim 5, wherein the bit comparison circuitry comprises bit examination circuitry to identify whether any bits of the less significant portion of the second floating-point operand are set as the third comparison.

8. The data processing apparatus as claimed in claim 4, wherein the first floating-point operand is an integer.

9. The data processing apparatus as claimed in claim 4, wherein the first floating-point operand is 3.0.

10. The data processing apparatus as claimed in claim 4, further comprising multiplication circuitry to multiply a first input value and a second input value to produce the second floating-point operand.

11. The data processing apparatus as claimed in claim 10, wherein the data processing apparatus is responsive to a reciprocal square root step instruction specifying the first input value and the second input value to operate the multiplication circuitry, the bit comparison circuitry, the difference circuitry, and the right-shift circuitry.

12. The data processing apparatus as claimed in claim 1, comprising near path circuitry and far path circuitry each to calculate a rounded result obtained by performing a division-by-two on the difference between the first floating-point operand and the second floating-point operand,
    wherein the far path circuitry comprises exponent decrement circuitry to perform the division-by-two as an exponent decrement, and
    wherein the near path circuitry comprises the difference circuitry and the right-shift circuitry.

13. A method of operating a data processing apparatus comprising:
    performing a first comparison and a second comparison in dependence on a more significant portion of a first floating-point operand and of a second floating-point operand, wherein performing the first comparison comprises comparing the more significant portion of the first floating-point operand and of the second floating-point operand, and wherein performing the second comparison comprises comparing a test value given by the more significant portion of the first floating-point operand minus a least significant bit in the more significant portion with the more significant portion of the second floating-point operand;
    performing a third comparison of a less significant portion of the first floating-point operand and of the second floating-point operand;
    generating a subnormal flag signal in response to either the first comparison or the second comparison revealing no difference and the second comparison revealing a difference in the less significant portion;
    calculating a difference between the first floating-point operand and the second floating-point operand; and
    performing a 1-bit right shift on the difference calculated when the subnormal flag signal is generated.

14. A data processing apparatus comprising:
    means for performing a first comparison and a second comparison in dependence on a more significant portion of a first floating-point operand and of a second floating-point operand, wherein performing the first comparison comprises comparing the more significant portion of the first floating-point operand and of the second floating-point operand, and wherein performing the second comparison comprises comparing a test value given by the more significant portion of the first floating-point operand minus a least significant bit in the more significant portion with the more significant portion of the second floating-point operand;

means for performing a third comparison of a less significant portion of the first floating-point operand and of the second floating-point operand;
means for generating a subnormal flag signal in response to either the first comparison or the second comparison revealing no difference and the second comparison revealing a difference in the less significant portion;
means for calculating a difference between the first floating-point operand and the second floating-point operand; and
means for performing a 1-bit right shift on the difference calculated in response to the means for generating the subnormal flag signal generating the subnormal flag.

* * * * *